United States Patent [19]

Wolf

[11] Patent Number: 4,929,352
[45] Date of Patent: May 29, 1990

[54] DEVICE FOR FILTERS, INSERT FOR FILTERS AND FILTER

[76] Inventor: Joachim Wolf, Malmsheimer Str. 67, 7252 Weil der Stadt, Fed. Rep. of Germany

[21] Appl. No.: 194,480

[22] Filed: May 16, 1988

[51] Int. Cl.⁵ .................. B01D 27/08; B01D 35/02
[52] U.S. Cl. .................. 210/232; 210/282; 210/444; 210/450
[58] Field of Search ............. 210/232, 323.2, 356, 210/450, 452, 448, 438, 435, 440, 443, 444, 456, 282; 55/429

[56] References Cited

U.S. PATENT DOCUMENTS

| | | | |
|---|---|---|---|
| 3,055,503 | 9/1962 | Oliver | 210/438 |
| 3,067,880 | 11/1962 | Bowers et al. | 210/444 |
| 3,746,171 | 7/1973 | Thomsen | 210/440 |
| 3,954,624 | 5/1976 | Petrucci | 210/444 |
| 4,517,085 | 5/1985 | Driscoll et al. | 210/232 |
| 4,579,657 | 4/1986 | Hood, Jr. | 210/440 |
| 4,608,166 | 8/1986 | Cain | 210/435 |
| 4,645,601 | 2/1987 | Regunathan et al. | 210/438 |
| 4,711,717 | 12/1987 | Wolf | 210/232 |
| 4,735,716 | 4/1988 | Petrucci et al. | 210/440 |
| 4,764,275 | 8/1988 | Robichaud | 210/450 |
| 4,806,240 | 2/1989 | Giordano et al. | 210/440 |
| 4,818,396 | 4/1989 | Wolf | 210/232 |
| 4,836,925 | 6/1989 | Wolf | 210/323.2 |
| 4,855,047 | 8/1989 | Firth | 210/443 |
| 4,857,191 | 8/1989 | Wolf | 210/443 |

OTHER PUBLICATIONS

International Patent Publication WO88/05333, Donaldson Company Inc., 28 Jul. 1988, (Priority date of 16 Jan. 1987).

Primary Examiner—Frank Spear
Assistant Examiner—Joseph Drodge

[57] ABSTRACT

A filter device includes a circular adapter firmly and integrally connected to a head as a unit enclosing therebetween a fluid distribution compartment in a fluid-tight manner. The head is provided with upward extending outflow and feed connectors. The adapter is provided with downward extending cartridge connectors to which filter cartridges are connectable. The head and adapter unit is further provided with a conical collar on its outer periphery. A gripping clamping ring surrounds the collar. Between the collar and the clamping ring, the top region of at least one flexible foil bag is clamped. The outer conical surface of the clamping ring is pressed against an inwardly directed conical surface on the upper rim of a filter pot.

14 Claims, 3 Drawing Sheets

DEVICE FOR FILTERS, INSERT FOR FILTERS AND FILTER

The invention relates to a filter device, a filter insert and an associated filter.

BACKGROUND OF THE INVENTION AND RELEVANT PRIOR ART

Such a filter device comprises a circular adapter, having at least one means for connecting a filter cartridge. The connecting means protrudes downwards from said adapter. A circular head joins integrally to and is positioned above the adapter. The circular adapter and the circular head have a common outer periphery. A distribution compartment is positioned between the head and the adapter. A sealing device is in the area of the outer periphery. A clamping surface is in the area of the outer periphery and is adapted to press against the top region of a flexible filter bag.

Such a device became known in the prior art from German OS No. 3,520,139, which corresponds to U.S. Pat. No. 4,711,717 of the same inventor.

Such a device filters very harmless media, but also extremely dangerous media. It is clear that the sealing plays a very great part. The known device had the following disadvantages:

(a) An O-ring 34 is used which is subject to tension stress to retain it in its groove. Thus it varies its properties in the course of time.

(b) The O-ring 34 additionally had the task of holding the end zone 29 of the flexible bag 16. In doing so, it loses sealing quality. Insofar as the end zone 29 can be drawn over the outer surface 28 and lies in the seating groove of the O-ring 34, it has a smaller diameter and consequently forms folds.

(c) The O-ring 34 must develop extraordinarily great tension forces if it is to hold a fluid-filled flexible bag 16 when the adapter is to be removed from the bowl 17. At that moment, the whole weight hangs on the O-ring 34.

(d) A separate head 78 and an adapter 62 are necessary. A separation surface lies between the two. One seeks to keep the outer edge sealed by drawing the lid 84 against the bowl 69. Since, however, these parts are injection-moldings, which do not tolerate excessively high-grade production, the surfaces are uneven. This must be compensated by extraordinary high pressure. If, however, an extraordinary high pressure is exerted upon synthetic plastic material, the material flows in the course of time. If it flows, the sealing quality deteriorates.

(e) If one takes the head 78 off, surfaces previously wetted by the fluid are exposed. In the case of toxic substances this is very dangerous. Even in the case of non-dangerous substances this leads to a substantial cleaning effort.

(f) The head 78 too has to be cleaned before it is used with a new adapter 62.

(g) Pressures occurring in the fluid distribution compartment can bend the adapter 62 downwards, which leads to fluid short-circuits, working the O-ring and causing pivoting movements of the filter cartridges. This occurs because the adapter 62 domes into a partial sphere.

(h) The device for drawing the clamping plate 84 and the clamping ring 83 against one another must be extraordinarily strong. This leads to over-thickness, weight, clumsiness and high price.

(i) The sealing areas must be extraordinarily large, and a great deal of material is situated around the sealing areas, making the device expensive. High material expense is, however, undesirable in non-reusable devices.

(j) If one were to use two flexible bags—one for safety outside the other that retains the fluid—it would be much too great a task for the O-ring 34.

OBJECT AND STATEMENT OF THE INVENTION

It is the object of the invention to provide a device, an insert and a filter which avoid the above-indicated disadvantages.

These objects are achieved by the following features of the filter device:

(a) Said circular head and said circular adapter are firmly and integrally connected together at adjacent surfaces thereof that are positioned inward relative to said sealing device to contain said distribution compartment in a fluid-tight manner between said circular head and said circular adapter, and (b) A solid annular collar extends radially outside of said outer periphery, is firmly and integrally connected thereto, has an underside with a conical outer surface and forms a part of said sealing device.

An insert for the filter comprises filter cartridges hanging from the underside of said device within a flexible bag, below a top region of said bag, which top region is secured in a fluid-tight manner on said conical outer surface of said collar.

A filter for use with such device or such insert has a filter pot with an upper annular bead having a conical inner surface, said conical outer surface on said collar providing a cooperating surface having a slope complementary to said slope of said conical inner surface of said upper annular bead, said conical inner surface having a minimum diameter that is smaller than the largest diameter of said conical outer surface of said collar, a lid with a clamping conical outer surface, a clamping conical inner surface on said collar directed towards said lid, said conical inner surface having a slope complementary to said slope of said conical outer surface of the lid, and a clamping device for drawing said lid with high force against said filter pot.

The described embodiment includes the following additional advantageous features:

The device has a geometric central axis, and said conical outer surface on said collar has a slope that is at a sharp angle relative to said geometrical central axis. The wedge effect, i.e. the force multiplier resulting from applying forces at a sharp angle, can be exploited; that is, tightening forces on the device produce even greater pressure application forces on the upper and undersides i.e. conical inner and outer surfaces, of the collar. Moreover, such a collar stiffens the device, in contrast to a radial collar.

The collar extends upwards. An auxiliary channel is provided in case fluid should nevertheless be spilt. Moreover, the collar does not interfere with assembling the head to the adapter. For example, the head and adapter could be produced in two parts and joined at a common interface in one plane by welding together adjacent end wall surfaces. Moreover, the upper region of the flexible filter bag can be stretched, by reason of the upward and outward slope of the collar, so that folds do not form in the bag.

Further stiffening is obtained from the upwards extending collar and the clamping device for the lid and pot, which contributes to sealing, can be located sufficiently far outwards, so that inwardly one has a continuous surface on which the flexible bag can rest under pressure.

A clamping ring (circlip) is arranged to grip said collar with spring bias, has an inner surface with a slope that extends at a sharp angle relative to said geometrical central axis of the device and is arranged so that said conical outer surface of said collar and said inner surface of said clamping ring are pressed together face to face. The top region of the flexible bag can be made with a large area and without harmful stress on the bag. It is to be considered that the flexible bag consists of thin foil, for example, fifteen-hundredths of a millimeter thick. Another advantage is that the foil faces two well-defined, large-area counterfaces on the relatively stiff collar and on the relatively stiff clamping ring so that the sealing force can be great without the foil being subjected to point stress.

The top regions of two flexible filter bags can be clamped fast to each other and to the collar. If the inner flexible filter bag should become leaky, the outer bag is still present. Moreover, the outer bag protects the inner against damage, for example, in transport.

The collar has an end that extends into a short first annular extension which extends substantially vertically upwards, and the clamping ring has an upper end region with a second outer annular extension having a shape that conforms at least in part to the first annular extension and is arranged to seat against the first annular extension. Once engaged, the clamping ring does not spring back downwards out of its position.

A clamping ring is provided against the top region of the flexible bag, which is clamped between the clamping ring and the collar.

The top region extends upwards above the collar where it is welded to the collar. Further security is gained, both as regards sealing and as regards mechanically securing the foil bag on the device.

The top region of the flexible filter bag in the unstretched and unstressed condition has a diameter of the collar. As a result, the top region always lies smoothly and forms no folds.

The advantages of the device and the insert are useful in a complete filter, and even better sealing conditions are obtained by the following features: the conical inner surface of the upper annular bead on the filter pot has upper and lower conical surfaces, the lower conical surface is at a more acute angle to the geometric central axis of the device than the upper conical surface whereby a shallow angle is formed between the upper and lower conical surfaces. The angle presses at a quite specific circular ridge on the conical inner surface of the upper annular bead.

DETAILED DESCRIPTION OF PREFERRED EMBODIMENT

Figure 1:
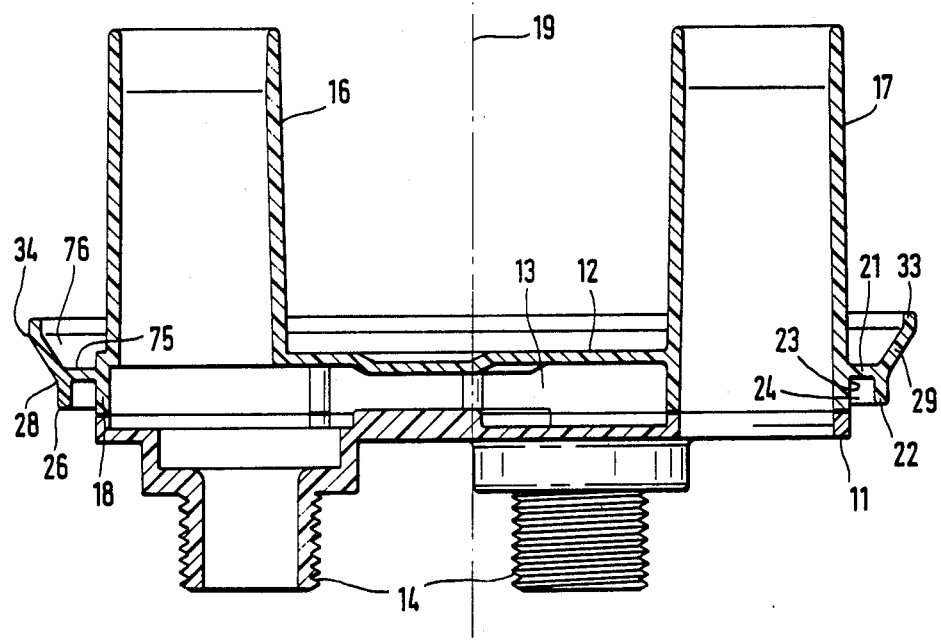
FIG. 1 shows a cross-section through the combination of adapter and head.
Figure 2:
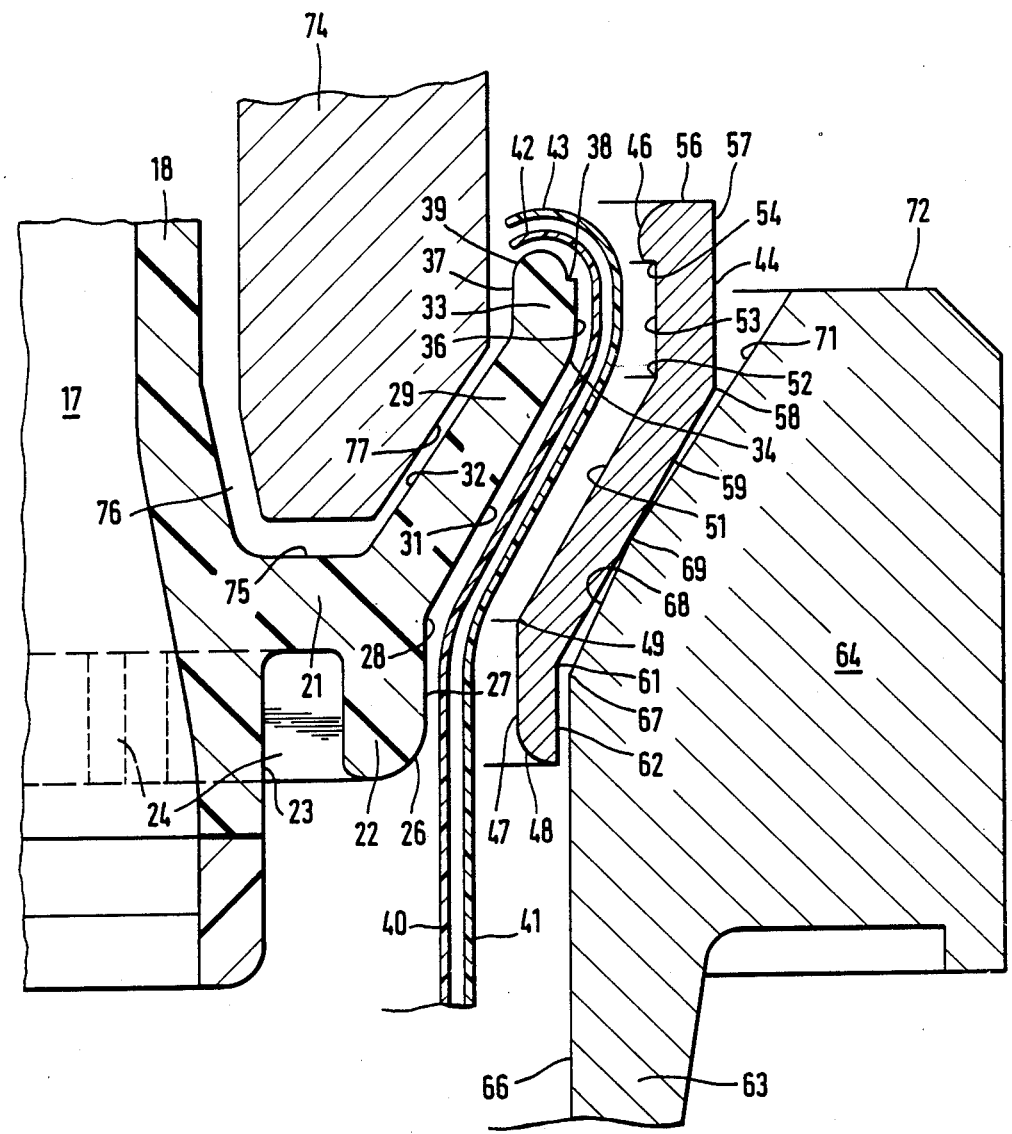
FIG. 2 shows the right collar zone of FIG. 1 on the scale 2:1 relative to FIG. 1, but in exploded representation with the top region of two foil filter bags, clamping ring and the upper zone of the filter pot edge.

According to FIG. 1 an adapter 11 and a head 12 are combined into one unit which consists of relatively thin-walled synthetic plastic material. The two enclose a relatively large distribution compartment 13. From the underside of the adapter 11 connector pieces 14 point downwards, onto which filter cartridges can be pushed. An outflow connector 16 and a feed connector 17 extend upwards from the head 12. The adapter 11 and the head 12 are integrally connected with one another at their external circumference (outer periphery) by a common outer wall 18 that forms a shallow cylinder that extends coaxially with the geometrical central axis 19. The cross-sections of all walls lie in the range of 3 mm; that is, they are relatively thin compared with a total diameter of the cylindrical wall 18 in the region of about 20 cm. In the right lower region, the outer wall of feed connector 17 is common with the outer wall 18. A circumferential flange 21 in the form of an annular ring extends integrally and horizontally from the outer wall 18. It is about 4 mm. thick. The dimensions of the other structural elements shown in FIG. 2 are on the same scale as shown for outer wall 18. The circumferential flange 21, like outer wall 18, is solid. Neither has openings that connect to the distribution compartment 13.

A coaxial, downwardly directed stiffening ring 22 extends from the outer end zone of the circumferential flange 21. The consequent downwardly open, coaxial channel 23 is traversed at regular intervals by narrow, radial stiffening bridges 24, so that the wall region of the outer wall 28 that lies at the same level as the channel 23 can be supported on the stiffening ring 22 and vice versa. This increases stiffness.

At the bottom and outwards the stiffening ring 22 has a quarter-circular surface 26. Its outer, coaxial, cylindrical wall zone 27 reaches to about mid-height of the circumferential flange 21, and after a bend 28, extends as a collar 29 that is coaxial with the geometrical central axis 19. The collar 29 is about 3 mm. thick and goes outwards and upwards at about 35 degrees. More precisely, its conical outer surface 31 rises at an angle of 32 degrees, while its conical concentric inner surface 32 goes outwards and upwards at 35 degrees, so that to this extent the collar 29 tapers somewhat.

The end zone of the collar 29 extends integrally as a coaxial end ring 33, which points vertically upwards and is short in comparison with the length of the collar 29, as can be seen from FIG. 2. Its outer surface 36, beginning after a bend 34, is inclined outwards by an angle of 3 degrees, just like the inner surface 37 parallel thereto. The outer surface 36 is upwardly adjoined by a coaxial, continuous, step-shaped ledge 38 about 0.25 mm wide, from which it transitions into an approximately semi-circular arc 39 and then into the inner surface 37.

FIG. 2 shows in exploded representation the top regions 40, 41, of two synthetic plastic material foil bags inverted into one another. Their ends 42, 43 are integrally connected (for example by welding) with the semi-circular arc 39 for reasons of security and in aid of assembly. The top regions 40, 41 can be pushed on because of the ascending flank of collar 29, sliding up on the outer surface 31, and thus they lie tautly, smoothly and evenly from the wall zone 27 and over the ledge 38.

A circlip (clamping ring) 44 is injection-molded in one piece from synthetic plastic material, and has the cross-section as shown in FIG. 2. Its diameter is such that its inwardly directed continuous bead 46, of the form of a third of a circle, abuts close beneath the bend 34 when the clamping ring 44 is in the unstressed condition. The clamping ring 44 is in one piece without interruption. When gripping about the collar 29 and the top regions 40, 41 of the flexible bags, the lower inner surface 47 is placed externally against the top region 41 and clamps the pertinent regions against the wall zone 27. In order to avoid holes due to sharp edges, the inner surface 47 swings away outwards and downwards with a quarter-circle 48, so that together with the ascending flank 26 it forms a protective, ever-narrowing funnel.

In the gripping condition the corner 49 fits closely into the corner 28—with the top regions 40, 41 always therebetween. The inner surface 51, rising to the right at an angle of 32 degrees, also extends parallel with the outer surface 31 and there clamps the top regions 40, 41 over a relatively large area. The bend 52, which is followed by a vertical upward inner surface 53, corresponds to the bend 34. The concavity 54 at the same level matchingly corresponds to the ledge 38. The concavity 54 can be seated on the ledge 38, with interposition of the wall thickness of the filter bags, which provides an additional certainty that the clamping ring will not spring off downwards. The connection holds without adhesion, but it is also possible to apply adhesive to the inwardly directed surfaces of the clamping ring 44.

The bead 46 extends upwards into a radial surface 56 followed by a vertically downwards extending outer surface 57, after a bend. Somewhat beneath the bend 52 there is a bend 58 followed by a conical outer surface 59 which is parallel to the inner surface 51 and reaches to beneath the corner 49, to a corner 61. Then there is a vertically descending outer surface 62 which transitions acutely into the quarter circle 48. The inner surfaces 47, 51 and 53 of the clamping ring 44 have a slight underdimensioning in relation to the wall zone 27, the outer surface 31 and the outer surface 36. After the clamping ring 44 is sprung into position all these surfaces lie under pressure against one another.

This pressure would not suffice for sealing. Rather a metal filter pot 63 has an upper thickened wall 64 which is coaxial with the geometrical central axis 19 in the assembled condition of the filter. The inner surfaces of wall 64 are continuous and nowhere interrupted. The inner surface 66 of the wall extends cylindrically; that is, vertically upwards as far as a bend 67.

In the finally assembled condition, the filter pot 63 is clamped to the wall 74 of lid 73 with the clamping ring 44 tightly pressed between the wall 64 of the filter pot 63 and the collar 29. The bend 67 lies at the level of the corner 61. However the outer surface 62 has a spacing from the inner surface 66. The bend 67 is followed by a conical surface 68 which is at 16 degrees to the geometrical central axis 19. This is more acute than the outer surface 59 of the clamping ring. The conical surface 68 reaches to the shallow circular ridge 69 and after this shallow ridge transitions into a conical surface 71, which is at an angle of 32 degrees to the geometrical central axis 19. This substantially longer conical surface 71 reaches to about mid-height of the outer surface 57, which is not outwardly supported. The conical surface 71 transitions into a radial ring surface 72.

From lid 73, counter-wall 74 hangs down with continuous surfaces coaxial with the geometrical central axis 19. The bottom 75 of the annularly coaxially surrounding channel 76 formed by the collar 29 and the outer wall 18 reaches near the bottom of wall 74, but does not come into contact with wall 74 when the lid is clamped in place. The wall 74 also does not contact the outer wall 18, and thus is narrower than the channel 76 at all points. In the finally assembled condition, outer surface 77 of wall 74, standing at 35 degrees, protrudes outwards and upwards and lies against the inner surface 32 of the collar 29, but not against the inner surface 37. This comes from the fact that the outer surface 77 is not as high as the inner surface 32.

Filter cartridges (not shown), are secured to connector pieces 14 and hang below the adapter 11. The cartridges are contained in the foil bag 41. The top regions of the bags 40 and 41 (one within the other) fit tightly over the conical collar 29 on the head/adapter. The unit fits in the filter pot 63. The clamping ring 44 grips with spring bias about the collar 29, and the lid 73 is clamped by bolts (not shown) to the top of the filter pot so that the clamping ring 44 is squeezed by the top of the filter pot against the top of the foil bags 40, 41, and the collar 29, and the outer conical surface 77 on wall 74 press against the conical inner surface 32 of the conical collar 29.

In the finally assembled condition of the filter, the entire filter is clamped together and seals as follows: Bolts (not shown) draw the lid 73 against the filter pot 63. Thus, the conical outer surface 77 of the lid 73 presses upon the conical inner surface 32 of the collar 29. Also the conical outer surface 31 of collar 29 presses against the top regions 40, 41 of the filter bags. These press against the inner surface 51 of the clamping ring 44. The outer surface 59 of the clamping ring 44 presses primarily against the circular ridge 69, which constitutes a shallow angle, so that the main sealing force is applied there. The outer surface 59 on the clamping ring 44 cooperates with the conical inner surfaces 68, 69, 71, of the pot bead. Since the clamped-in parts are of synthetic plastic material, the material yields somewhat between the inner surface 51 and the outer surface 59 of the clamping ring 44, so that zones around the ridge 69 also contribute to the sealing—even though with lower pressure.

In another embodiment, not shown, it is also possible to make do without the clamping ring 44. If there is a possibility that the ridge 69 may press through the top regions 40, 41, then the angle between the conical surface 68 and the concial surface 71 would have to be made even shallower, or these surfaces would have to transition into one another without any angle at all. In this case, it is very important to reliably connect the top region or regions 40, 41 with the collar 29 above the bend 34.

There is no need to alter the dimensions of the clamping ring 44, whether one or two filter bags are used, for its elasticity readily takes up the differences of the circumference.

Figure 3:
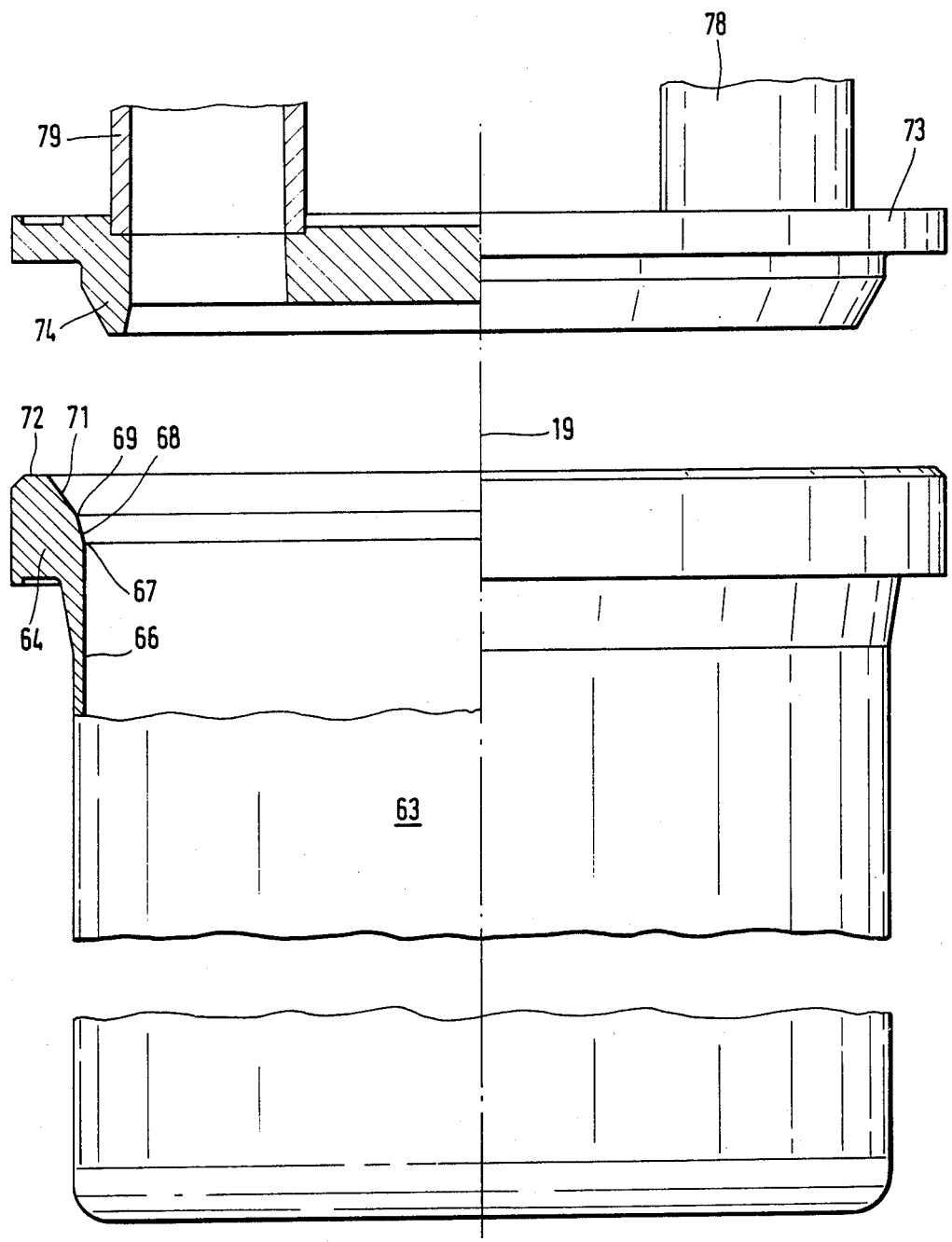
FIG. 3 shows a representation of the broken-away filter pot with lid arranged thereabove on the scale of FIG. 1. The adapter and head arrangement shown in FIG. 1 fits within the lid and filter pot shown in FIG. 3.

The feed connector 78 and the outflow connector 79 are indicated in FIG. 3.

In operation, used fluid enters the filter through the feed connector 17, is filtered by the filter cartridges 80, passes through the distribution chamber 13 and exits as filtered fluid through the outflow connector 16.

Because the adapter is connected with the head in a firm, integral and fluid-tight manner, fluid pressure peaks will not cause an escape of fluid. When the filter cartridges are to be replaced, the whole unit of adapter/head/foil bag/cartridges is changed, thereby avoiding any manual contact with filter medium.

I claim:

1. A filter insert including a filter device, which device has an underside and a top side and comprises:
   a circular adapter,
   a circular head,
   said adapter and circular head having a common outer periphery,
   a sealing device in the area radially outside of said outer periphery,
   said head and said adapter being firmly and integrally connected together at adjacent surfaces thereof that are positioned inward relative to said sealing device to contain
   said distribution compartment fluid-tight between said head and said adapter, and
   a solid annular collar extending radially outside of said outer periphery and having an underside with a conical outer surface and forming part of said sealing device,
   said insert comprising filter cartridges hanging from said underside of said device within a flexible bag below a top region of said bag, which top region is secured in a fluid-tight manner on said conical outer surface of said collar.

2. Insert according to claim 1, comprising a clamping ring, wherein said top region of said flexible bag is clamped between said clamping ring and said collar.

3. Insert according to claim 2, wherein said top region extends upwards above said collar and is welded to said collar.

4. Insert according to claim 1, wherein said collar has a varying diameter and said top region of said flexible bag in an unstretched condition of said flexible bag has a diameter that is at most equal to the largest diameter of said collar.

5. Insert according to claim 4, wherein in an unstretched condition said top region has a diameter that is smaller than the largest diameter of said collar.

6. Insert according to claim 1, in combination with a filter pot with an upper annular bead having a conical inner surface, said conical outer surface on said collar providing a cooperating surface having a slope complementary to said slope of said conical inner surface, said conical inner surface of said upper annular bead having a minimum diameter that is smaller than the largest diameter of said conical outer surface of said collar, a lid with a clamping conical outer surface,
   a clamping conical inner surface on said collar directed towards said lid, said conical inner surface having a slope complementary to said slope of said conical outer surface of the lid,
   and a clamping device for drawing said lid with high force against said filter pot.

7. Insert and filter according to claim 6, wherein said conical inner surface of said upper annular bead comprises upper and lower conical surfaces, said lower conical surface is at a more acute angle to the geometric central axis of the device than said upper conical surface, and a shallow ridge is formed between said upper and lower conical surfaces.

8. Insert and filter according to claim 6, wherein a fluid-tight clamping ring is arranged to grip said collar with spring bias and bears a cooperating outer surface having a slope complementary to said slope of said conical inner surface on said upper annular bead of said filter pot.

9. In a filter device comprising:
   a circular adapter having at least one means for connecting a filter cartridge thereto, said connecting means protruding downwards from said adapter,
   a circular head joined integrally to and positioned above said circular adapter,
   said circular adapter and said circular head having a common outer periphery,
   a sealing device in the area radially outside of said outer periphery, and
   a distribution compartment between said circular head and said circular adapter
   the improvement wherein:
   (a) said circular head and said circular adapter are firmly and integrally connected together at adjacent surfaces thereof that are positioned inward relative to said sealing device to contain said distribution compartment in a fluid-tight manner between said circular head and said circular adapter, and
   (b) a solid annular collar extends radially outside of said outer periphery is firmly and integrally connected thereto, has an underside with a conical outer surface and forms a part of said sealing device.

10. Device according to claim 9, wherein said device has a geometric central axis, and said conical outer surface has a slope that is at a sharp angle to said geometrical central axis.

11. Device according to claim 9 wherein a one-piece, fluid-tight annular flange extends from said outer periphery and supports said collar and is connected therewith in a fluid-tight manner and said annular flange is connected with said outer periphery in a fluid-tight manner.

12. Device according to claim 9 wherein a clamping ring is arranged to grip said collar with spring bias, has an inner side with a slope that extends at a sharp angle to said geometrical central axis and is arranged so that said conical outer surface of said collar and said inner side of said clamping ring are pressed together face to face.

13. Device according to claim 12, wherein top regions of two flexible bags can be clamped fast.

14. Device according to claim 12 wherein said collar has an end that transitions into a short first annular extension that extends substantially vertically upwards, and said clamping ring has an upper end region with a second outer annular extension having a shape that conforms at least in part to said first annular extension on said collar and is arranged to
   seat against said first annular extension and snap into said first annular extension.

* * * * *